United States Patent
Kim

(10) Patent No.: US 10,012,120 B2
(45) Date of Patent: Jul. 3, 2018

(54) APPARATUS AND METHOD FOR REGENERATING DIESEL PARTICULAR MATTER FILTER

(71) Applicant: Hyundai Motor Company, Seoul (KR)

(72) Inventor: Young Ki Kim, Iksan-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 14 days.

(21) Appl. No.: 15/391,421

(22) Filed: Dec. 27, 2016

(65) Prior Publication Data

US 2017/0342882 A1    Nov. 30, 2017

(30) Foreign Application Priority Data

May 24, 2016  (KR) .................. 10-2016-0063184

(51) Int. Cl.
| | | |
|---|---|---|
| *F01N 3/00* | (2006.01) | |
| *F01N 3/027* | (2006.01) | |
| *F01N 9/00* | (2006.01) | |
| *F02M 31/13* | (2006.01) | |

(52) U.S. Cl.
CPC ............ *F01N 3/027* (2013.01); *F01N 9/002* (2013.01); *F02M 31/13* (2013.01); *F01N 2900/08* (2013.01); *F01N 2900/12* (2013.01)

(58) Field of Classification Search
CPC ...... F01N 9/002; F01N 3/027; F01N 2900/12; F01N 2900/08; F02M 31/13
USPC ........................................................ 60/295
See application file for complete search history.

(56) References Cited

U.S. PATENT DOCUMENTS

| | | | |
|---|---|---|---|
| 5,558,074 A * | 9/1996 | Fukatsu .................. | F02P 3/02 |
| | | | 123/647 |
| 8,240,285 B2 | 8/2012 | Hinkovska et al. | |
| 2005/0096833 A1* | 5/2005 | Nakazawa .......... | F02D 41/0002 |
| | | | 701/102 |

(Continued)

FOREIGN PATENT DOCUMENTS

| | | |
|---|---|---|
| JP | 1994-004354 U | 1/1994 |
| JP | 2005-067532 A | 3/2005 |
| KR | 20-2000-0002610 U | 2/2000 |

(Continued)

*Primary Examiner* — Jason Shanske
(74) *Attorney, Agent, or Firm* — McDermott Will & Emery LLP

(57) ABSTRACT

An apparatus for regenerating a diesel particular matter filter includes an outdoor temperature sensor for detecting an outdoor temperature, a water temperature sensor for detecting a cooling water temperature of an engine, an air heater for heating intake air of the engine, a relay temperature sensor for detecting a heater relay temperature, a controller for generating and outputting a signal for controlling a heater relay to activate or deactivate the air heater and a signal for controlling a cooling fan to be operated based on detection values input from the outdoor temperature sensor, the water temperature sensor and the relay temperature sensor, a heater relay configured to be turned on and off depending on the control signal output from the controller to operate or stop the air heater, and a cooling fan configured to be selectively operated depending on the control signal output from the controller and ventilate air for cooling the heater relay upon the operation.

9 Claims, 3 Drawing Sheets

(56) References Cited

U.S. PATENT DOCUMENTS

2017/0226967 A1* 8/2017 Dudar ............... F02M 25/0818

FOREIGN PATENT DOCUMENTS

| KR | 10-2002-0009205 A | 2/2002 |
| --- | --- | --- |
| KR | 10-1097681 B1 | 12/2011 |
| KR | 10-2016-0050201 A | 5/2016 |

* cited by examiner

APPARATUS AND METHOD FOR REGENERATING DIESEL PARTICULAR MATTER FILTER

CROSS-REFERENCE TO RELATED APPLICATION

This application claims under 35 U.S.C. § 119(a) the benefit of priority to Korean Patent Application No. 10-2016-0063184, filed on May 24, 2016 with the Korean Intellectual Property Office, the entire contents of which are incorporated herein by reference.

TECHNICAL FIELD

The present disclosure relates to an apparatus and a method for regenerating a diesel particular matter filter, and more particularly, to an apparatus and a method for regenerating a diesel particular matter filter capable of preventing overheating of a heater relay when an air heater is used to heat intake air of an engine.

BACKGROUND

Generally, exhaust gas means gas emitted into the air through an exhaust system. Exhaust gas, resulting from air and fuel combusted in a combustion chamber of an engine, includes harmful substances such as carbon monoxide (CO), nitrogen oxide (NOx) and unburned hydrocarbons (HC).

Further, even though a diesel engine generates excellent fuel efficiency and power, unlike a gasoline engine, the exhaust gas from a diesel engine includes a large quantity of nitrogen oxide and particulate matter (PM).

Recently, as regulations for exhaust gases of a vehicle are tightened, as post-processing systems for reducing harmful substances in the exhaust gas, a diesel oxidation catalyst (DOC), a diesel particular matter filter (DPF), selective catalytic reduction (SCR) systems, or the like have been applied.

Among them, the diesel oxidation catalyst (hereinafter, referred to as 'DOC') and the diesel particular matter filter (hereinafter, referred to as 'DPF') serve to reduce the particulate matter (PM) in the exhaust gas of the diesel engine.

Referring to FIG. 1, an exhaust gas post-processing system includes a DOC 1 configured to combust unburned components in exhaust gas of an exhaust pipe of an engine 4 by a catalytic action, a DPF 2 configured to collect a particulate matter in the exhaust gas, an exhaust valve 5, temperature sensors 6 and 7 configured to each detect temperatures of the exhaust gas of an inlet of the DOC 1 and an inlet of the DPF 2, a differential pressure sensor 8 configured to detect a differential pressure of front and rear sides of the DPF, and the like.

The DPF 2 requires and employs a regeneration process for removing soot, or black dirt, of the particulate matter, which is deposited at a predetermined level or higher and the temperature of the DPF 2 rises to an ignition temperature of the soot, or higher, during the regeneration process to combust and remove the soot.

The DPF regeneration is performed according to a result of detecting the differential pressure by the differential pressure sensor 8, or is performed when a DPF relevant mileage accumulated by a vehicle reaches a predetermined value (that is, when a DPF relevant mileage reaches a DPF regeneration period according to a distance driven by the vehicle).

The soot collected in the DPF is burned off by hydrocarbon injection (HCl) of hydrocarbon (HC) (fuel) into the exhaust pipe of the front side of the DOC 1 at the time of the regeneration of the DPF 2 to increase and/or maintain the temperature of the exhaust gas. In this case, an injector 3 that injects fuel into the exhaust pipe is used.

That is, the temperature of the exhaust gas introduced into the DOC (1) is increased by injecting fuel into the front side of the DOC 1 through the injector 3, the temperature of the exhaust gas is increased by using reaction heat emitted at the time of a generation of $NO_2$ in the DOC 1, and the DPF 2 forcibly combusts the soot by the temperature of the high-temperature exhaust gas.

Meanwhile, a method for increasing a temperature of exhaust gas in multiple stages to secure a stable regeneration temperature at the time of the generation of the DPF has been applied. FIG. 2 illustrates a method for increasing temperature in a multiple stages.

FIG. 2 illustrates a method for securing a regeneration temperature by a two-stage temperature raising process after the regeneration mode entry. A one-stage temperature raising process of increasing initial idle temperature (cold) to a given temperature (for example, 300° C.), and then a two-stage raising temperature and regeneration temperature holding process of additionally increasing the temperature to a target regeneration temperature (for example, 600° C.) are performed.

The one-stage temperature raising process may increase the temperature by opening a turbocharger bypass valve, cutting off an intake throttle valve, retarding fuel injection timing, cutting off an EGR valve, or the like, and the two-stage temperature raising process may increase a temperature of the inlet of the DPF (temperature of exhaust gas of the inlet of the DPF) to a target temperature by injecting fuel into the exhaust pipe through the injector and may maintain the temperature.

However, when the initial idle temperature is too low after the regeneration mode entry, for example, when an outdoor temperature is low during winter, it is difficult to increase the temperature and secure a regeneration temperature, and there is a problem of a reduction in a DPF regeneration success rate due to a cold condition of the overall system.

It is difficult to ensure target temperature raising performance under a low temperature condition and a warm-up time is also long, which has an adverse effect on the regeneration success rate and the regeneration period of the DPF.

Further, if a fuel injection quantity of the engine is increased to quickly increase temperature, the occurrence of white smoke is increased and if the fuel injection quantity is reduced to reduce the white smoke, it is difficult to increase temperature.

To solve the problem, an air heater installed to increase an intake temperature of the engine is used to smoothly enable the regeneration temperature at the time of the active regeneration of the DPF during the low temperature condition.

The air heater heats intake air of an intake manifold and if the air heater is installed in the intake manifold to apply a current for a predetermined time during, before or after initial starting, the air heater generates heat through heat radiation, convection or conduction, and increases the intake temperature of the engine through the transfer of the generated heat to increase the temperature of the exhaust gas while preventing the unburned combustion of the engine.

The air heater is operated at an early stage at the time of the active regeneration of the DPF during the low outdoor temperature condition to heat charge air to quickly enter the temperature condition of the exhaust gas for the regeneration.

However, when the air heater is used for a long time in warmer conditions, a temperature around a relay may be greatly increased due to heat generation of the relay turning on/off an operation of the air heater, that is, a heater relay, such that heat damage or damage to parts, such as a cover, around the relay may occur.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

An object of the present disclosure is to provide an apparatus and a method for regenerating a diesel particular matter filter capable of preventing overheating of a heater relay when an air heater is used to heat intake air of an engine and increase temperature of the intake air of the engine to thereby increase temperature of exhaust gas at the time of the regeneration of the diesel particular matter filter.

In one aspect, the present disclosure provides an apparatus for regenerating a diesel particular matter filter, including: an outdoor temperature sensor configured to detect outdoor temperature; a water temperature sensor configured to detect cooling water temperature of an engine; an air heater configured to heat intake air of the engine; a relay temperature sensor configured to detect a temperature of a heater relay; a controller configured to generate and output a signal for controlling the heater relay to activate or deactivate an air heater and a signal for controlling a cooling fan to be operated based on detection values input from the outdoor temperature sensor, the water temperature sensor and the relay temperature sensor; a heater relay configured to be turned on/off depending on the control signal output from the controller to operate or stop the air heater; and a cooling fan configured to be selectively operated depending on the control signal output from the controller and ventilate air for cooling the heater relay upon the operation.

In a preferred embodiment, the controller may be set to generate and output the control signal for controlling the heater relay to operate the air heater when the outdoor temperature detected by the outer temperature sensor is lower than a first setting temperature and the cooling water temperature of the engine detected by the water temperature sensor is lower than a second setting temperature.

In another preferred embodiment, the control signal for controlling the heater relay to operate the air heater may be a control signal for repeatedly turning on and then turning off the heater relay.

In still another preferred embodiment, the controller may be set to generate and output the control signal for repeatedly turning on and then turning off the heater relay while the air heater heats intake air of the engine.

In yet another preferred embodiment, the cooling fan may be a radiator cooling fan that is installed in an engine compartment in which the heater relay is positioned to cool a radiator.

In still yet another preferred embodiment, the controller may be set to generate and output the control signal for operating the cooling fan when a temperature of the heater relay detected by the relay temperature sensor exceeds a third setting temperature.

In still another aspect, the present disclosure provides a method for regenerating a diesel particular matter filter, including: detecting, by a sensor, outdoor temperature and cooling water temperature of an engine in a temperature raising mode of the diesel particular matter filter (DPF); turning on a heater relay to operate an air heater heating intake air of the engine when the detected outdoor temperature is lower than a first setting temperature and the detected cooling water temperature of the engine is lower than a second setting temperature; detecting, by the sensor, a temperature of the heater relay during the operation of the air heater; and operating a cooling fan for cooling the heater relay when the detected temperature of the heater relay exceeds a third setting temperature.

In a preferred embodiment, the heater relay may be repeatedly turned on and then turned off while the air heater heats the intake air of the engine.

In another preferred embodiment, the cooling fan may be a radiator cooling fan that is installed in an engine compartment in which the heater relay is positioned to cool a radiator.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example vehicle having both gasoline-powered and electric-powered sources.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
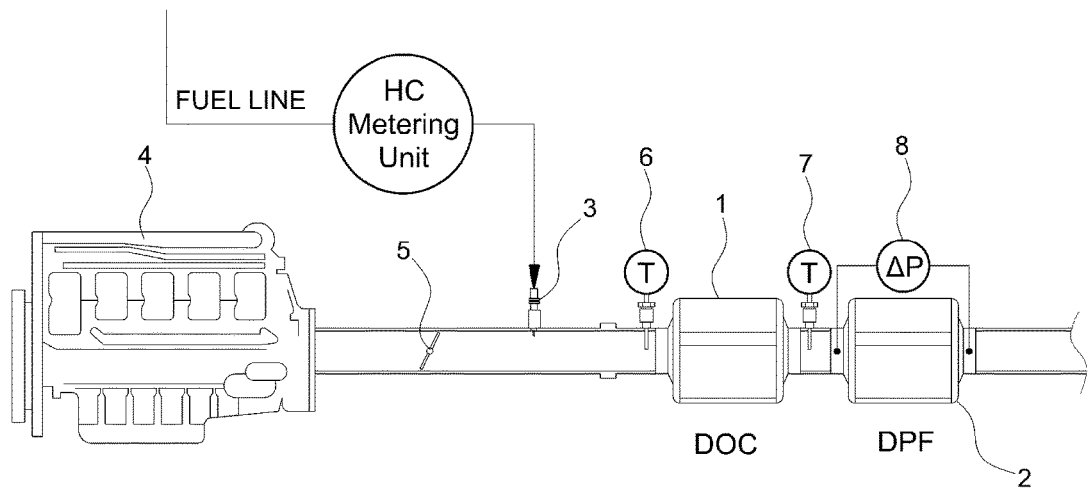
FIG. 1 is a diagram illustrating an exhaust gas post-processing system of a diesel engine.
Figure 2:
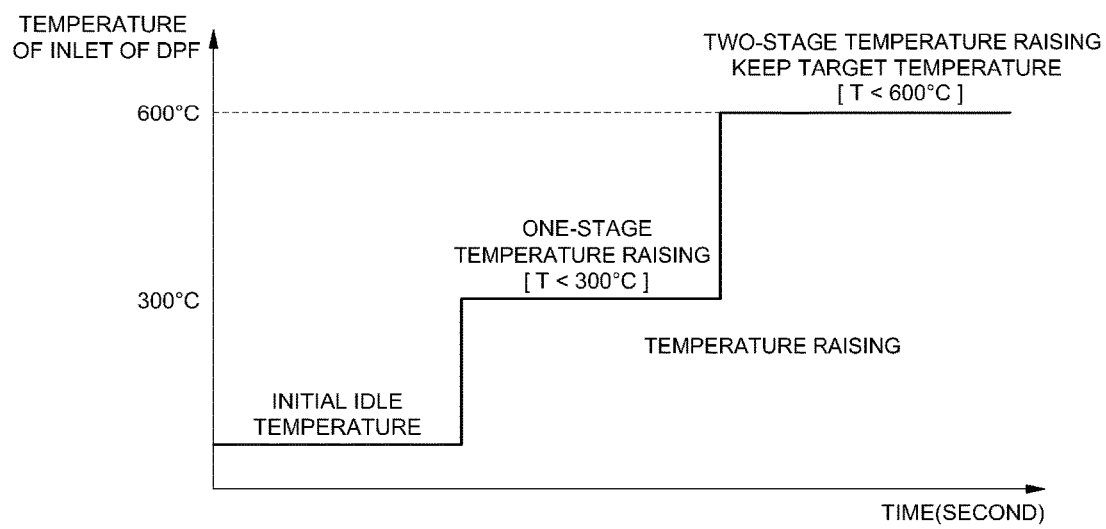
FIG. 2 is a diagram for describing an existing temperature raising method for regenerating a DPF.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure so as to be easily practiced by a person skilled in the art to which the present disclosure pertains will be described in detail with reference to the accompanying drawings. However, the present disclosure is not limited to the exemplary embodiments herein, but may be implemented in other forms.

Throughout the present specification, unless explicitly described to the contrary, "comprising" any components will be understood to imply the inclusion of other elements rather than the exclusion of any other elements.

The present disclosure provides an apparatus and a method for regenerating a diesel particular matter filter capable of preventing overheating of a heater relay when an air heater is used to heat intake air of an engine and increase temperature of the intake air of the engine to thereby increase a temperature of exhaust gas at the time of the regeneration of the diesel particular matter filter.

Figure 3:
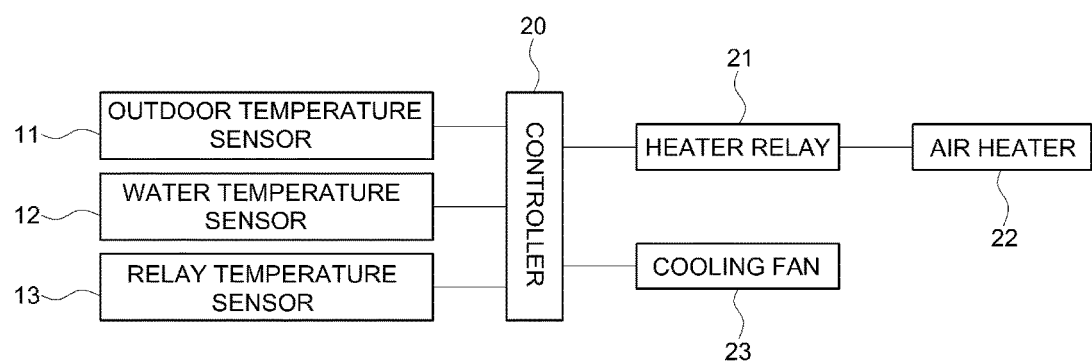
FIG. 3 is a block diagram illustrating a configuration of an apparatus for regenerating a diesel particular matter filter according to exemplary embodiments of the present disclosure.
Figure 4:
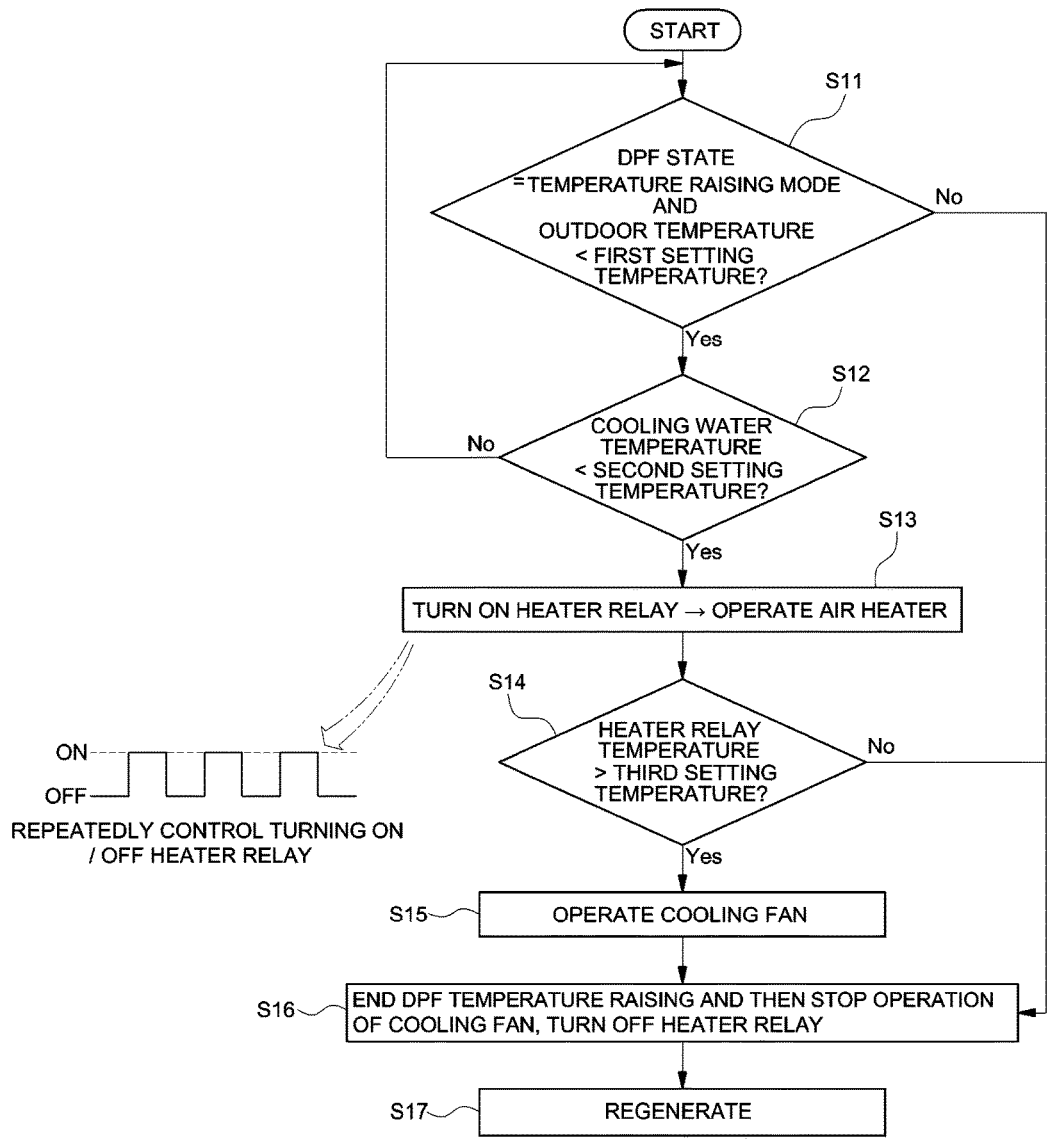
FIG. 4 is a flowchart illustrating a method for regenerating a diesel particular matter filter according to exemplary embodiments of the present disclosure.

FIG. 3 is a block diagram illustrating a configuration of an apparatus for regenerating a diesel particular matter filter according to exemplary embodiments of the present disclosure and FIG. 4 is a flowchart illustrating a method for regenerating a diesel particular matter filter according to exemplary embodiments of the present disclosure.

As illustrated in FIG. 3, the apparatus for regenerating a diesel particular matter filter according to exemplary embodiments of the present disclosure includes: an outdoor temperature sensor 11 configured to detect an outdoor temperature; a water temperature sensor 12 configured to detect a cooling water temperature of an engine; an air heater 22 configured to heat intake air of the engine; a relay temperature sensor 13 configured to detect a temperature of a heater relay; a controller 20 configured to output a control signal for controlling a heater relay 21 to be turned on/off and output a control signal for controlling an operation of a cooling fan 23 based on detection values of the outdoor temperature sensor 11, the water temperature sensor 12, and the relay temperature sensor 13; a heater relay 21 configured to be turned on/off depending on the control signal output from the controller 20 to operate or stop the air heater 22; and a cooling fan 23 configured to be selectively operated depending on the control signal output from the controller 20 and ventilate air for cooling the heater relay 21 upon the operation of the cooling fan 23.

In addition, the apparatus for regenerating a diesel particular matter filter according to exemplary embodiments of the present disclosure may further include an HC injection apparatus (including an injector 3 of FIG. 1) that injects a hydrocarbon (HC) into an exhaust pipe of the engine to increase a temperature of exhaust gas to a target regeneration temperature and maintain the temperature.

The apparatus for regenerating a diesel particular matter filter according to exemplary embodiments of the present disclosure includes the HC injection apparatus that is operated to increase the temperature of the exhaust gas to the target regeneration temperature and maintain the temperature, along with the air heater 22 that is operated to increase the temperature of the exhaust gas in the temperature raising mode.

In the above configuration, the controller 20 receives the detection values of the outdoor temperature sensor 11 and the water temperature sensor 12 at the time of a DPF temperature raising mode to determine whether the heater relay 21 is turned on/off and outputs the control signal for controlling the turning on/off of the heater relay according to the determined result.

According to exemplary embodiments of the present disclosure, the cooling water temperature of the engine detected by the water temperature sensor 12 may be a criterion for determining whether a temperature in an engine compartment is low enough to operate the air heater 22 (turn on the heater relay) or not.

Further, the controller 20 receives the detection value of the relay temperature sensor 13 and determines whether the cooling fan 23 is operated based on the detection value, and outputs the control signal for controlling the operation of the cooling fan according to the determined result.

The air heater 22 is installed in an intake manifold of the engine to heat the intake air of the engine, to thereby increase the temperature of the intake air of the engine and the temperature of the exhaust gas.

The heater relay 21 is a switch for turning on/off the operation of the air heater 22, and applies a current for the heat generation operation of the air heater 22 when the heater relay 21 is turned on.

The cooling fan 23 may be a general radiator cooling fan installed to cool parts such as a radiator and an intercooler of the engine compartment in a vehicle and an operation of the cooling fan 23 is controlled according to the control signal output from the controller 20.

Hereinafter, a method for regenerating a diesel particular matter filter according to exemplary embodiments of the present disclosure will be described with reference to FIG. 4.

First, the controller 20 determines the DPF temperature raising mode and then compares outdoor temperature detected by the outdoor temperature sensor 11 with a preset first setting temperature in the DPF temperature raising mode (S11), and compares the cooling water temperature of the engine detected by the water temperature sensor 12 with a second setting temperature if the outdoor temperature is determined to be a low temperature condition where the outdoor temperature is lower than the first setting temperature (S12).

Here, if the cooling water temperature of the engine is lower than the second setting temperature, the controller 20 turns on the heater relay 21 to operate the air heater 22 (S13).

As described above, in the temperature raising mode, the controller 20 does not unconditionally operate the air heater 22 but operates the air heater 22 only in the low temperature condition, where the outdoor temperature is lower than the first setting temperature.

The first setting temperature may be set to be 20° C. in consideration of temperature at which white smoke of the engine is not generated, but the present disclosure is not limited thereto, and therefore the first setting temperature may be variously changed according to different design or experimental results.

The cooling water temperature has a specific heat higher than that of some parts in the engine components and, therefore a cooling rate thereof is low. As a result, the cooling water temperature may be a criterion for determining the temperature of the engine compartment, and there is a need to operate the air heater 22 only when the temperature of the engine compartment is not high even though the outdoor temperature is low.

Therefore, according to exemplary embodiments of the present disclosure considering this situation, when the cooling water temperature is lower than the second setting temperature, the controller 20 turns on the heater relay 21 to operate the air heater 22.

The second setting temperature may be set to be 80° C. in consideration of temperature required to operate the air heater 22, but the present disclosure is not limited thereto, and therefore the second setting temperature may be variously changed according to different designs and experimental results.

Meanwhile, if the heater relay 21 is turned on, a current required for the heat generation operation of the air heater 22 may be applied to the air heater 22 through the heater relay 21, and therefore the air heater 22 performs the heat generation operation to heat the intake air of the engine.

According to exemplary embodiments of the present disclosure, the controller 20 does not continuously turn on the heater relay 21 and the air heater 22, but controls the heater relay 21 and the air heater 22 to be periodically turned on/off. For this purpose, the controller 20 outputs a control signal to repeatedly turn on and off the heater relay 21 every given period.

If the heater relay 21 is turned on, the air heater 22 performs the heat generation operation and if the heater relay 21 is turned off, the heat generation operation of the air heater 22 stops.

In the periodic turning on/off control of the heater relay 21, the turning-on time and the turning-off time may be variously set and controlled. For example, the controller 20 turns on the heater relay 21 for 25 seconds to perform the heat generation operation of the air heater 22, and then turns off the heater relay 21 for 5 seconds to stop the operation of the air heater 22 and then the steps of turning on the heater relay 21 for 25 seconds and turning off the heater relay 21 for 5 seconds are set to be repeated.

Further, in the turning on/off control state of the heater relay 21 and the operation state of the air heater 22, the controller 20 compares the heater relay temperature detected by the relay temperature sensor 13 with a third setting temperature (S14). If the heater relay temperature exceeds the third setting temperature, the controller 20 operates the cooling fan 23 to cool the heater relay 21 in the engine compartment (S15).

As such, when the internal temperature of the heater relay 21 is high during the operation of the air heater 22 in the temperature raising mode, the controller 20 forcibly operates the cooling fan 23 in the engine compartment to lower the temperature around the heater relay 21.

By doing so, the overheating of the heater relay 21 and the air heater 22 may be prevented and heat damage or damage of surrounding parts due to overheating may be prevented.

The third setting temperature may be set in consideration of a temperature at which surrounding parts, such as cover, do not suffer from heat damage or are not damaged. For example, the third setting temperature may be set to be, for example, 150° C., but the present disclosure is not limited thereto.

Further, if the DPF temperature raising mode progresses and thus the temperature of the exhaust gas detected by the sensor rises to a primary target temperature, the controller 20 stops the operation of the cooling fan 23 and keeps the heater relay 21 in the turning-off state to stop the operation of the air heater 22 (S16).

Further, to increase the temperature of the exhaust gas to a final target regeneration temperature and maintain the target regeneration temperature, the controller 20 operates the HC injection apparatus to inject HC into the exhaust pipe of the engine, thereby performing the regeneration of the DPF (S17).

By doing so, the present disclosure may continuously operate the heater relay 21 and the air heater 22 at all times in the temperature raising mode but may periodically turn on/off repeatedly the heater relay 21 and the air heater 22, thereby effectively preventing the heat generation and overheating of the heater relay and the air heater.

Further, it is possible to improve the operation section of the air heater 22 by adding logic considering the temperature state within the engine compartment in the control scheme and using the outdoor temperature to strengthen the safety operation, and it is possible to effectively reduce the temperature of parts by driving the cooling fan 23 when the ambient temperature rises after the air heater 22 is operated.

Hereinabove, although exemplary embodiments of the present disclosure are described above in detail, the protection scope of the present disclosure is not limited thereto. Therefore, various changes and improved forms by those skilled in the art using basic concepts of the present disclosure defined in the following claims belongs to the protection scope of the present disclosure.

What is claimed is:

1. An apparatus for regenerating a diesel particular matter filter, comprising:
   an outdoor temperature sensor for detecting an outdoor temperature;
   a water temperature sensor for detecting a cooling water temperature of an engine;
   an air heater for heating intake air of the engine;
   a relay temperature sensor for detecting a heater relay temperature;
   a controller for generating and outputting a signal for controlling a heater relay to activate or deactivate the air heater and a signal for controlling a cooling fan to be operated based on detection values input from the outdoor temperature sensor, the water temperature sensor and the relay temperature sensor;
   a heater relay configured to be turned on and off depending on the control signal output from the controller to operate or stop the air heater; and
   a cooling fan configured to be selectively operated depending on the control signal output from the controller and ventilate air for cooling the heater relay upon the operation.

2. The apparatus of claim 1, wherein the controller is set to generate and output the control signal for controlling the heater relay to operate the air heater when the outdoor temperature detected by the outer temperature sensor is lower than a first setting temperature and the cooling water temperature of the engine detected by the water temperature sensor is lower than a second setting temperature.

3. The apparatus of claim 2, wherein the control signal for controlling the heater relay to operate the air heater is a control signal for repeatedly turning on and then turning off the heater relay.

4. The apparatus of claim 1, wherein the controller is set to generate and output the control signal for repeatedly turning on and then turning off the heater relay while the air heater heats intake air of the engine.

5. The apparatus of claim 1, wherein the cooling fan is a radiator cooling fan that is installed in an engine compartment in which the heater relay is positioned to cool a radiator.

6. The apparatus of claim 1, wherein the controller is set to generate and output the control signal for operating the cooling fan when the heater relay temperature detected by the relay temperature sensor exceeds a third setting temperature.

7. A method for regenerating a diesel particular matter filter, comprising:
   detecting, by a sensor, an outdoor temperature and a cooling water temperature of an engine in a temperature raising mode of the diesel particular matter filter (DPF);
   turning on a heater relay to operate an air heater for heating intake air of the engine when the detected outdoor temperature is lower than a first setting temperature and the detected cooling water temperature of the engine is lower than a second setting temperature;
   detecting, by the sensor, a heater relay temperature during the operation of the air heater; and
   operating a cooling fan for cooling the heater relay when the detected heater relay temperature exceeds a third setting temperature.

8. The method of claim 7, wherein the heater relay is repeatedly turned on and then turned off while the air heater heats the intake air of the engine.

9. The method of claim 7, wherein the cooling fan is a radiator cooling fan that is installed in an engine compartment in which the heater relay is positioned to cool a radiator.

* * * * *